United States Patent Office 3,316,148
Patented Apr. 25, 1967

3,316,148
ENOMYCIN AND PROCESS FOR PREPARATION
Hamao Umezawa, 23 Kita, 4-chome, Toyotama, Nerima-ku, Tokyo, Japan
No Drawing. Filed Nov. 6, 1963, Ser. No. 321,679
Claims priority, application Japan, Nov. 30, 1962, 37/52,634
4 Claims. (Cl. 167—65)

This invention relates to a new and useful substance called enomycin and to processes for its production. More particularly, it relates to processes for its production by fermentation and methods for its recovery and purification. The invention embraces this antitumor agent in dilute solutions, as crude concentrates and as purified solids. Enomycin exhibits no antibacterial activity, but is useful to prolong the survival period of mice inoculated with Ehrlich carcinoma and with mouse sarcoma 180 and to inhibit the growth of Yoshida rat sarcoma cells in tissue culture.

There is provided, according to the present invention the process for the production of an antitumor agent, designated enomycin, which comprises cultivating an enomycin-producing strain of *Streptomyces mauvecolor*, e.g. A.T.C.C. 14911, in an aqueous carbohydrate solution containing a nitrogenous nutrient under submerged aerobic conditions until substantial activity against Ehrlich ascites carcinoma is imparted to said solution and then, if desired, recovering said enomycin from said solution. There is further included within the scope of the present invention the enomycin so-produced.

The microorganism producing the enomycin of the present invention was isolated from a sample of soil collected at Shinjuku Gyoen, Tokyo, Japan, and is a new variety of the species *Streptomyces mauvecolor*. A culture of the living organism, given the laboratory designations A-390-P4 and A-9825, has been deposited with the Mycology Division, Department of Antibiotics, National Institute of Health, Kamiosaki-Chojamaru, Shinagawa-ku, Tokyo, Japan, and added to its permanent collection of microorganisms as NIHJ A-390-P4 and also has been deposited in the American Type Culture Collection, Washington, D.C., and added to its permament collection of microorganisms as A.T.C.C. 14911.

The representative strain (A.T.C.C. 14911) of the enomycin-producing organism has the following characteristics:

(1) *Microscopical observation.*—Aerial mycelium with 0.5–1.0 micron of width is branched and developed from the growth on Krainsky's glucose asparagine agar at 28° C. The tip of the aerial hyphae bends or forms imperfect spirals. The spore-chain at the tip of aerial mycelium shows spiny surface of spores by electron microscope.

(2) *Glycerol Czapek agar*, 27° C.—Light yellowish-brown growth, white aerial mycellium, no soluble pigment.

(3) *Krainsky asparagine glucose agar*, 27° C.—Light brownish growth, light mauve colored aerial mycelium, no soluble pigment.

(4) *Starch plate*, 27° C.—Light brownish growth, light purplish-pinkish aerial mycelium, slight brownish soluble pigment, positive hydrolysis.

(5) *Calcium malate agar*, 37° C.—Colorless growth, white aerial mycelium, no soluble pigment.

(6) *Nitrite peptone water*, 27° C.—Dark brownish ring growth, gray aerial mycelium, dark brown soluble pigment.

(7) *Nutrient agar*, 37° C.—Yellowish growth, brownish soluble pigment.

(8) *Gelatin medium.*—Dark brown growth, dark brown soluble pigment, no liquefaction.

(9) *Blood agar*, 37° C.—Light yellowish brown growth, no aerial mycelium, no hemolysis.

(10) *Loeffler coagulated serum*, 37° C.—Light yellowish brown growth, no aerial mycelium, brown soluble pigment, no liquefaction.

(11) *Potato plug*, 27° C.—Light dark brown growth, white aerial mycelium, blackish-brown soluble pigment.

(12) *Carrot plug*, 27° C.—Colorless to cream growth, white to light gray aerial mycelium.

(13) *Egg medium*, 37° C.—Light yellowish-brown growth, white aerial mycelium, purplish-brown soluble pigment.

(14) *Milk.*—Abundant cream growth on the surface, no aerial mycelium, light dark brown soluble pigment, positive coagulation, weak peptonization.

(15) *Carbohydrate utilization using Czapek salt as the basal medium.*—It showed abundant growth using glycerol, glucose, mannose, galactose, slight growth using arabinose, maltose, lactose, salicin, dextrin, starch. Almost no growth using acetate succinate, rhamnose, xylose, fructose, sorbitol, mannitol, inositol, sorbose, sucrose, inulin.

A careful comparative study of the strain showed it to be mostly similar to *Streptomyces mauvecolor*, although there are some minor differences. The holotype culture of *Streptomyces mauvecolor* formed numerous spirals on Krainsky's glucose asparagine agar, whereas the strain A-390-P4 formed imperfect spirals. The former utilized arabinose and dextrin for good growth, whereas the latter utilized them poorly. Considering the variation of properties in streptomycetes, the above minor differences do not readily distinguish between them and it was decided the strain belongs to *Streptomyces mauvecolor*. The invention is not to be limited to organisms fully answering the above description which is merely for illustrative purposes only. Other microorganisms, i.e. mutants produced from *Streptomyces mauvecolor* by exposure to various mutating agents such as X-radiation, ultraviolet light, high speed electron, nitrogen mustard and the like or spontaneous natural mutants can also produce enomycin. In other words, the invention includes all microorganisms which produce enomycin and are not able to be distinguished clearly from the natural or artificial mutants of *Streptomyces mauvecolor*.

Enomycin is obtained by the cultivation of enomycin-producing organisms under proper conditions. The spore or mycelium of enomycin-producing organisms is inoculated to a proper medium and incubated aerobically. The cultivation in solid medium is also available for the production of enomycin but liquid cultivation is preferable for large-scale production of enomycin. Temperature for incubation is chosen for the good growth of enomycin-producing organisms and usually 25–35° C. is preferable. The medium for the production of enomycin may include starch, dextrin, glucose, glycerol, maltose, sucrose, lactose, oil, fat or molasses and the like as the carbon sources in either purified or crude state. As the nitrogen source, soybean flour, distiller's solubles, peanut flour, cotton seed flour, meat extract, peptone, fish meat powder, yeast extract, corn steep liquor, hoey, casein or its hydrolysate and the like may be included and, if necessary, inorganic nitrogen such as nitrate or ammonium salts and sodium chloride, phosphate, magnesum or calcium salts may be added to the medium. In addition, trace amounts of heavy metals may be used if necessary. All the components for the growth of streptomycetes which are described in Canadian Patent 51,324, British Patents 730,341, 736,325 and U.S. Patents 2,691,618, 2,658,018, 2,653,899, 2,586,762, 2,516,080, 2,483,892, 2,609,329 and 2,709,672 are available for the medium. Antifoaming agents, such as liquid paraffin, fat, silicone resins and the like can be used for antifoaming during the cultivation. All other known methods for the production of antibiotics, such as of penicillin or streptomycin can be used for the production of the said antibiotics.

Where not otherwise specified, the following procedures or testing methods are used in this invention.

(1) *Shaking culture.*—A 500 ml. Sakaguchi flask containing 150 ml. medium is sterilized at 120° C. for 20 minutes. To this, the spore or mycelium of enomycin-producing organisms is inoculated and shake-cultured at 27–29° C. on a shaking machine with 120 strokes/min. and 8 cm. amplitude. Seed culture of the above 48-hour culture is inoculated at the ratio of 1 ml. to 150 ml. of medium and shake-cultured further as above.

(2) *Tank culture.*—The medium (180 l.) in a stainless-steel tank (400 l.) is sterilized by steam at 120° C. for 30 minutes. After the inoculation of enomycin-producing organism, it is incubated with aeration of 200 l. per minute and stirring of 200 r.p.m. Silicone or soy bean oil is used for the antifoam.

(3) *Quantitative assay of enomycin.*—Enomycin inhibits experimental tumors in animals and Yoshida sarcoma cells in tissue culture. One million cells of Ehrlich tumor of mice are inoculated into dd-line of mice intraperitoneally and daily injection of the sample (0.3 cc.) is begun and continued for 10 days after the inoculation with the tumor cells. The minimum doses of sample inhibiting increase of ascites after seven days and that necessary to prolong the survival time of mice over 35 days are determined. In tissue culture, assay is made to determine the minimum inhibitory concentration of sample necessary to show 50% inhibition when the nucleic acids in tissue culture are measured by the method of McIntire et al. which appeared in Proc. Soc. Experimental Biology and Medicine, vol. 98, p. 76 (1958). The tumor cells are obtained from ascites of rat seven days after the intraperitoneal administration of Yoshida sarcoma cells (10 million) and the tissue culture is incubated at 37° C. for three days. 1.5 cc. of sample in Tyrode's solution is mixed with 1.5 cc. containing tumor cells (5 to $10 \times 10^4$) in Tyrode's solution to which albumin hydrolysate has been added at 5%.

Chemical determination is made as follows: The cationic resin, IRC–50 ($H^+$), is filled in a column of 1 cm. in diameter and 5–10 cc. of aqueous solution (pH 6) of sample is passed through. After washing with 10 ml. of water and 50% aqueous acetone, elution is made by 0.25 N HCl–50% aqueous acetone. Effluents at pH about 4 are collected and concentrated in vacuo. A portion of the concentrate is chromatographed, issuing as the solvent, butanol:acetic acid:water (4:1:5). The original spot is cut out and the intensity of ninhydrin reaction is measured.

The enomycin-producing organism has been shake-cultured in the following medium: Meat extract 0.75%, peptone 0.75%, NaCl 0.3%, starch 1.0%, glucose 1.0%. It was sterilized and the pH was adjusted to 7.0. When 0.3 cc. of the 4-day fermented medium was injected every day to tumor-bearing mice for ten days, the survival time of the mice was prolonged. The pH of the medium at 3, 4, 5, 6 and 7 days was 5.0, 6.5, 7.6, 8.2 and 8.8 respectively. The survival time of tumor-bearing mice was prolonged by 4-fold dilution of this 5- or 6-day fermented medium.

Enomycin is produced in various media containing various nitrogen and carbon sources. Glycerol, starch and glucose are preferred carbon sources for the production of enomycin, and meat extract, peptone, NZ-amine and yeast extract are good nitrogen sources. Casein and hydrolysates of casein are also good sources of nitrogen.

When the medium containing glucose 1.0%, starch 1.0%, amino acids from hydrolyzed casein 0.75%, peptone 0.75% and NaCl 0.3% (pH 7.0 after sterilization) was used, the pH of the medium after 3, 4 and 5 days of fermentation was 5.8, 6.0 and 5.8 respectively. The 5-day broth prolonged the survival of tumor-bearing mice at 32-fold dilution.

When the medium containing starch 1.0%, glucose 1.0%, peptone 0.75% and casein 0.75% was employed, the pH of fermented broth at 3, 4, 5, 6 and 7 days was 5.6, 5.8, 6.0, 6.4 and 7.0 respectively. The 5-day fermented broth prolonged the survival time of tumor-bearing mice at 32-fold dilution.

Enomycin is not easily produced in synthetic medium, while it is produced readily in media containing at least one natural nitrogen source. The pH at the maximum production varied with the composition of medium employed. High production of enomycin can be achieved by the improvement of enomycin-producing organisms. The improvement can be made by mono-spore selection, or by mutation with ultraviolet irradiation, X-ray irradiation or other mutagens to yield highly productive strains and by selection of proper medium or cultural conditions as in the cases of other antibiotic production. Enomycin is stable at acid or neutral pH but unstable at weakly alkaline or alkaline pH. Therefore, neutral or acidic pH is preferable for high yield of enomycin during the production stage. As experienced in cases of other known antibiotics, high production of enomycin can be achieved in tank culture under the conditions for high production which is primarily established in shaking culture.

Enomycin in the culture broth exists mainly in the filtrate. The filtrate containing enomycin can be separated from the solid in the culture broth by filtration or centrifugation and the like. As shown later, enomycin is absorbed by cation exchange resins and can be absorbed after separation of solid or large particles from the broth. Enomycin in aqueous solution is not extractable either by butanol, ethyl acetate, butyl acetate, ether or benzene; treatment with those solvents is used for elimination of impurities. On the other hand, enomycin is basic in nature and is extractable by organic solvents if carriers such as organic acids are employed. Enomycin, thus extracted by organic solvents with the aid of a carrier, can be easily retransferred into acidic water.

Aqueous solutions are concentrated in vacuo to dryness to yield crude, solid enomycin. During such concentration it is preferable to keep pH neutral or weak acidic. Flash evaporator or spray drying methods can also be used. To eliminate impurities, it is helpful to wash the concentrated residue with organic solvents such as methanol, ethanol, acetone or ethyl acetate. Enomycin contained in the residue can be eluted by water and enomycin dissolved in water can be precipitated by organic solvents in which enomycin is insoluble and with which water can be mixed freely.

Enomycin in aqueous solution such as in fermented broth can be absorbed on active carbon and eluted by acidic water, acidic methanol or acidic acetone, although the yield is usually low. Enomycin is a high molecular weight, basic peptide and can be purified by ion-exchange resins. On the basis of the basic nature of enomycin, ion-exchange resins in which the functional radicals are sulfonic acids, carbonic acid or phenols can be used for the purification of enomycin. On the other hand, Van der Waals adsorption is useful for adsorption of enomycin. Cation-exchange resins which contain carbonic acid radicals or carboxymethylcellulose are proper absorbents for the isolation and purification of enomycin.

As described in U.S. Patents 2,319,359, 2,333,754, 2,340,110, 2,340,111, 2,528,188 and 2,541,420, cation-exchange resins such as IRC–50 (Rohm & Haas), especially in the hydrogen form, can be used for absorption and elution of enomycin. IRC-50 is a carboxylic type copolymer of methacrylic acid and divinyl benzene. Enomycin can be also absorbed by Na-type of IRC-50 resins, but one of the most preferable methods for the isolation of enomycin is as follows: Enomycin aqueous solution, such as cultural filtrate of pH 6.0 is passed through IRC-50 of H+ type and followed by washing with water and 50% acetone and then eluted with acidic 50% acetone. Effluent thus obtained is adjusted to pH 5-7 and dried in vacuo or freeze-dried. The powder thus obtained prolonged survival time of mice by daily injections of 125-50 μg./mouse/day although the results varied with the concentration of enomycin in cultured broth.

The enomycin thus obtained can be further purified, if desired, by chromatography on Sephadex. These are commercially available cross-linked dextran polymers which form gels with water and act as molecular sieves, said to absorb polyglucose molecules below 3,000, 7,000 and 10,000 molecular weight, respectively, for Sephadex G25, G50 and G75. Enomycin passes through a column of Sephadex G50 without being separated from inorganic salts and other low molecular weight substances but is efficiently separated from them by a Sephadex G25 column. Thus enomycin is believed to have a molecular weight in the range of 2,000 to 10,000. This procedure also removes the colored impurities from enomycin. Enomycin may also be purified by column chromatography on carboxymethylcellulose, using gradient elution with increasing concentration of ammonium formate from 0.01 M to 0.5 M and pH from 4.9 to 7.4.

The enomycin-containing powder obtained after treatment with IRC-50 resin was dissolved in a small amount of water and passed through Sephadex G25. The enomycin fraction was passed out ahead of fractions containing inorganic salts. The enomycin-containing fraction was concentrated in vacuo or freeze-dried to yield a pale brownish powder. Daily injections of 2-5 mg. of this powder per mouse prolonged the survival time of ascites tumor-bearing mice. Thus, enomycin can be separated from inorganic salts or other low molecular weight substances on the basis of its high molecular weight.

Cation exchange resins are available not only for isolation of crude enomycin but also for purification of enomycin. For example, carboxymethylcellulose was treated with 0.01 M $HCOONH_4$ (adjusted pH to 4.9 by HCOOH), and enomycin was dissolved in the latter solution, and applied to the former absorbent. Gradient chromatography with gradual addition of 0.5 M $HCOONH_4$ (adjusted to pH 7.4 by $NH_4OH$) to 0.01 M $HCOONH_4$ solution. When ion concentration reached to 0.45 M, enomycin appeared in effluent, and the active fraction was freeze-dried to yield the powder of pure enomycin.

On the basis of the properties of enomycin as described above, such as insolubility into organic solvents and the fact that it is a basic peptide of 2,000-10,000 molecular weight, enomycin can be separated partly or completely from impurities by known methods such as solution, precipitation, adsorption, elution, distillation, drying, washing, dialysis or extraction. By these methods, the base or its salt is obtained in a crude or purified state.

The purified enomycin showed the following properties: Pure enomycin is a white powder which is a high molecular weight peptide and does not show a definite decomposition or heating point. It is water-soluble and is only slightly soluble in methanol, ethanol, acetone, ethyl acetate, butyl acetate, ether, benzene and petroleum ether. Cation exchange resins adsorb enomycin; it is not eluted therefrom with aqueous acetone but is eluted with aqueous hydrochloric acid, acidic methanol or acidic acetone.

At the range between 210 and 400 mμ its aqueous solution shows a low peak in the ultraviolet adsorption spectrum at 278 mμ

($E_{1 cm.}^{1\%}$ 21)

in N/10 HCl and has no other significant absorption maxima.

Its infrared absorption spectrum in a KBr tablet exhibits maxima at 1170, 1230, 1350, 1390, 1455, 1550, 1595, 1650, 2940, 3100 and 3340 (cm.$^{-1}$).

Enomycin gives positive ninhydrin, diazo, Folin-phenol, Sakaguchi reactions. Benedict, Molisch, Fehling, anthrone and ferric chloride reactions are negative. Enomycin is optically active, $[\alpha]^{20}_D=-52°$ (c.=1, $H_2O$). The basic properties are shown by formation of reineckate, picrolonate and picrate salts and by paper electrophoresis (400 volts, 3 hours) using acetic acid-pyridine-water (8:40:952 in volume) which was pH 6.4. It moves to cathode as a single entity.

The result of elemental analysis is C, 47.14%, H, 7.4%, N, 14.45% and qualitative tests for sulfur, halogen and phosphorus are negative. After hydrolysis in 6 N HCl at 105° C. for 24 hours in a sealed tube, 14 ninhydrin positive products are formed as shown by two dimensional paper chromatography using butanol-acetic acid-water (4:1:5) and phenol-water (100:10). Seven of them were identified to be arginine, lysine, histidine, threonine, leucine (or iso-leucine), aspartic acid and tyrosine.

*Staphylococcus aureus, Bacillus subtilis, Escherichia coli,* Mycobacterium 607, *Candida albicans* and *Aspergillus oryzae* are not inhibited by enomycin, suggesting practically no antibacterial activity. In tissue culture, enomycin exhibits inhibition against Yoshida sarcoma cells but no deformation against HeLa cells.

The mice receiving subcutaneous inoculation of Ehrlich carcinoma cells are administered 1 mg. of enomycin/mouse/day 24 hours after inoculation with the tumor cells. Compared with the weight of the tumor in the control group, that in the treated group shows 73% inhibition and the survival time of mice is prolonged by injection of 0.325 mg. of enomycin/mouse/day.

Enomycin described above should be differentiated from known antitumor substances which have no antibacterial activity and show inhibition against tumor cells in both animal and tissue culture.

One which has to be compared is actinogan which was reported by H. Schmitz et al. in Cancer Research, vol. 22, p. 163. This substance is produced by an actinomycete, isolated by the procedure of ion exchange resins, eluted in an early fraction through Sephadex G25 column and having a suggested molecular weight of 134,000 not dialyzable. Elemental analysis showed C, 44.61; H, 5.85 and N, 2.00. Its hydrolysis gives aspartic acid, glutamic acid, glucose, rhamnose and hexosamine. The above hydrolysates, content of nitrogen and dialyzability clearly differentiate actinogen from that of enomycin.

Peptimycin is produced by *Streptomyces mauvecolor* to which species the strain of enomycin-producer belongs and was reported by M. Murase et al. in J. Antibiotics (Japan), vol. 14, p. 111. Although peptimycin is isolated by the same procedure of ion-exchange resins as in the case of enomycin, the hydrolysis of peptimycin gave leucine, valine, alanine, arginine, asparagine, histidine, glutamic acid, glycine, serine and another ninhydrin positive spot. The above results of hydrolysates of peptimycin are different from that of enomycin. In addition, as described by M. Hori et al. in J. Antibiotics (Japan), vol. 16, p. 1, peptimycin does not inhibit Yoshida sarcoma cells in tissue culture even at 100 mg./cc., while enomycin does. Thus, enomycin can be differentiated clearly from the known antitumor substances peptimycin and actinogen.

The minimal tolerable dose by daily intraperitoneal injection to mice was 5-10 μg./mouse/day. The daily injection of 0.5-1 mcg./mouse/day inhibited the ascites and solid type of Ehrlich carcinoma and mouse sarcoma 180. An example is shown in Table 1.

TABLE 1.—INHIBITORY EFFECT OF ENOMYCIN ON SOLID TUMOR OF EHRLICH CARCINOMA

[Treatment started 24 hours after inoculation of the tumor cells]

| | Daily Dose | | | |
|---|---|---|---|---|
| | 4 mcg./mouse | 2 mcg./mouse | 1 mcg./mouse | 0 | |
| Weight of each tumor. | 100 | 190 | 310 | 800 | 1,500 |
| | 105 | 209 | 350 | 900 | 1,550 |
| | 110 | 242 | 376 | 1,200 | 1,550 |
| | 125 | 275 | 390 | 1,300 | 1,600 |
| | 160 | 380 | 410 | 1,400 | 1,800 |
| | 180 | 420 | 410 | 1,400 | 2,000 |
| | 195 | 430 | 500 | 1,400 | 2,000 |
| | 210 | 490 | 510 | 1,450 | 2,200 |
| Average | 148 | 329.5 | 407 | 1,501 | |
| Percent | 9.8% (90.2%) | 21.9% (78.1%) | 27.0% (73.0%) | | |
| Effect | ++ | ++ | ++ | + | |

It did not cause degeneration in HeLa cells by the technique reported by Nitta [Jap. J. M. Sc. and Biol., 10(5): 277–286 (1957)], but showed inhibition against Yoshida rat sarcoma cells (50% inhibition dose was 5 mcg./ml.) when the growth of cells was examined by the method reported by Hori and others.

The following examples illustrate the formation, recovery, concentration and purification of enomycin. These examples are merely illustrative in nature and many changes or modifications of cultural conditions or other conditions can be made on the basis of the properties of enomycin herein described.

Example 1

Each 100 cc. of medium consisting of glucose 1%, starch 1%, meat extract 0.75%, peptone 0.75%, NaCl 0.3% was placed in a 500 cc. flask and sterilized at 120° C. for 30 minutes. After cooling, Streptomyces mauve-color strain A–390–P4 was inoculated and shake-cultured at 27–29° C. on the reciprocal shaking machine with 120 strokes/min. and 8 cm. amplitude. After five days, fermented broths in 50 flasks were mixed and yielded 4110 cc. of filtrate. The filtrate showed pH 8 and the intraperitoneal injection of 0.3 cc. thereof inhibited Ehrlich ascites tumor. IRC–50 resin (H) (500 cc.) was charged in a column 3 cm. in diameter and the above filtrate was adjusted to pH 6.0 and passed through this resin column. Then distilled water (5 l.) followed by 2 l. of 50% acetone were passed through the column to wash out much of the amount of brown colored substances. Finally, 0.25 N HCl–50% acetone was passed through and the effluents were fractionated. The first 300 cc. was pH 5.0 and did not contain enomycin. The second fraction of 80 cc. was pH 5.0 and its dried weight was 840.9 mg. This at 2 mg./mouse/day showed activity against Ehrlich tumor. The third fraction of 50 cc. was pH 4.2 and its dried weight was 708.3 mg. At 100 mg./mouse/day it showed the activity of enomycin. The fourth fraction of 50 cc. was pH 4.0 and its dried weight was 769.0 mg. At 50 mg./mouse/day it inhibited Ehrlich tumor. The fifth fraction of 100 cc. was pH 4.0 and its dried weight was 1284.7 mg. At 25 μg./mouse/day it inhibited Ehrlich ascites tumor. The sixth fraction of 100 cc. was below pH 1.0 and its dried weight was 1460.7 mg. At 50 μg./mouse/day it inhibited Ehrlich ascites tumor. The seventh fraction of 20 cc. was below pH 1.0 and its dried weight was 50.0 mg. At 2 mg./mouse/day it did not inhibit tumor. Then, the fifth fraction of 1284.7 mg. in dried weight was paper-chromatographed by using the solvent butanol-acetic acid-water (4:1:5). Ninhydrin positive spots appeared at Rf 0.5, 0.27, 0.22, 0.2, 0.1–0.2, 0–0.1 and 0. Enomycin existed at Rf 0.

Example 2

Of the fifth fraction obtained in Example 1, 500 mg. was dissolved in distilled water (about 1 cc.) and applied to a Sephadex column. The Sephadex column was prepared by placing 7 g. of Shephadex G25 in a column 1 cm. in diameter. Enomycin appeared in the first effluent and this was lyophilized to yield 72 mg. of which injection of 2–5 μg./mouse/day inhibited Ehrlich tumor.

Example 3

The powder (72 mg.) obtained in Example 2 was dissolved in 1 cc. of 0.01 M $HCOONH_4$ (pH 4.9) and suspended in the mixture of 9 g. carboxymethylcellulose and 0.01 M $HCOONH_4$ (adjusted to pH 4.9 by HCOOH). This suspended mixture was filled in a column 1 cm. in diameter and 350 cc. of 0.01 M $HCOONH_4$ (pH 4.9) was passed through. Then elution was made by 0.01 M $HCOONH_4$ (pH 4.9) to which 0.5 M $HCOONH_4$ (pH 7.4 by NaOH) was serially added, and finally the pH of the effluent reached 7.4 with 0.5 M $HCOONH_4$. The effluents of this gradient-chromatography were fractionated into each 10 cc. The tenth fraction (ion-concentration of 0.01 M) contained ninhydrin positive substance but did not show any activity against Ehrlich tumor. The 60th–70th fractions (ion concentration of 0.75 M) showed ninhydrin reaction but did not inhibit Ehrlich ascites tumor and had strong toxicity to mice. The 130th–140th fractions of which ion-concentration reached to 0.25 M contained enomycin and these fractions were lyophilized to yield white powder of 7 mg. Enomycin obtained from these fractions was in the pure state and inhibited Ehrlich ascites tumor by injection of 0.325 μg./mouse/day.

Example 4

Tank culture was made using a medium consisting of starch 1%, glucose 1%, peptone 0.75%, casein 0.75% (pH 7.0). The fermented broth of 72 hours' incubation was taken out at pH 6.1. The solid in broth was separated by centrifugation and yielded 180 l. of filtrate. This filtrate was applied to a column 10 cm. in diameter in which 20 l. of IRC–50 (H) resin was filled; its flow rate was 0.5 l./min. After the column was washed with 100 l. of distilled water and 50 l. of 50% acetone, elution was made by 0.25 N HCl–50% acetone at the rate of 50 cc./min. The fractions of pH 4.6–4.0 were collected and lyophilized to yield 163 g. of enomycin as a yellowish-brown powder. This powder prolonged the survival time of mice bearing Ehrlich ascites tumor by injection of 50 μg./mouse/day. This powder (45 g.) was treated with Sephadex G25 as described in Example 2 and yielded solid enomycin effective against the tumor at 2.5–5 μg./mouse/day.

Thus, the properties of enomycin are disclosed herein. The procedures shown in the examples above are not the only ones to produce enomycin but also any other known procedures can be used on the basis of properties of enomycin. For example, enomycin is basic and the formation of its inorganic or organic salts can be used for isolation or purification processes.

Enomycin can be used as its base, hydrochloride, sulfate, phosphate or salt with an organic acid of low toxicity. Solutions of enomycin at neutral or weak acidic pH are also available.

I claim:

1. The process of producing a biologically active substance, identified as enomycin, which comprises cultivating an enomycin-producing strain of Streptomyces mauve-color A.T.C.C. 14911 under submerged aerobic conditions in an aqueous carbohydrate solution containing a nitrogenous nutrient until substantial activity versus Ehrlich ascites carcinoma in mice is produced in said medium.

2. The process of producing a biologically active substance, identified as enomycin, which comprises cultivating an enomycin-producing strain of Streptomyces mauve-color A.T.C.C. 14911 under submerged aerobic conditions in an aqueous carbohydrate solution containing a nitrogenous nutrient until substantial activity versus Ehrlich ascites carcinoma in mice is produced in said medium and then recovering from the broth the enomycin thus produced.

3. The process of producing a biologically active substance, identified as enomycin, which comprises cultivating an enomycin-producing strain of *Streptomyces mauvecolor* A.T.C.C. 14911 under submerged aerobic conditions in an aqueous carbohydrate solution containing a nitrogenous nutrient at a temperature of substantially from 22° to 32° C. and for between about one and five days.

4. A biologically active substance identified as enomycin which is prepared by the process of claim 1.

References Cited by the Applicant

UNITED STATES PATENTS

| | | |
|---|---|---|
| 2,319,359 | 5/1943 | Wassenegger. |
| 2,333,754 | 11/1943 | Wassenegger. |
| 2,340,110 | 1/1944 | D'Alelio. |
| 2,340,111 | 1/1944 | D'Alelio. |
| 2,528,188 | 10/1950 | Taylor. |
| 2,541,420 | 2/1951 | Howe et al. |

OTHER REFERENCES

Hori et al.: J. Antibiot., 16, 1–6 (January 1963).

Murase et al.: Journal of Antibiotics, Series A, 14, 113–118 (1961).

Schmitz et al.: Cancer Research, 22 No. 2, 163–166 (February 1962).

Suhara et al.: J. Antibiotics (Japan), Series A, 16, 107–109 (1963).

ALBERT T. MEYERS, *Primary Examiner.*

J. GOLDBERG, *Assistant Examiner.*